United States Patent
Huang et al.

(10) Patent No.: US 11,835,331 B2
(45) Date of Patent: Dec. 5, 2023

(54) METHOD FOR FABRICATING SPECKLE FOR HIGH TEMPERATURE DEFORMATION MEASUREMENT OF SHAPED REFRACTORY MATERIAL

(71) Applicant: Wuhan University of Science and Technology, Wuhan (CN)

(72) Inventors: Ao Huang, Wuhan (CN); Shenghao Li, Wuhan (CN); Huazhi Gu, Wuhan (CN); Lvping Fu, Wuhan (CN); Yajie Dai, Wuhan (CN)

(73) Assignee: Wuhan University of Science and Technology, Wuhan (CN)

( * ) Notice: Subject to any disclaimer, the term of this patent is extended or adjusted under 35 U.S.C. 154(b) by 626 days.

(21) Appl. No.: 17/092,445

(22) Filed: Nov. 9, 2020

(65) Prior Publication Data

US 2021/0172730 A1 Jun. 10, 2021

(30) Foreign Application Priority Data

Dec. 5, 2019 (CN) .......................... 201911233372.8

(51) Int. Cl.
*G01B 11/16* (2006.01)
*G01N 25/00* (2006.01)
(Continued)

(52) U.S. Cl.
CPC ............ *G01B 11/162* (2013.01); *G01N 25/00* (2013.01); *B05D 1/02* (2013.01); *B05D 1/12* (2013.01);
(Continued)

(58) Field of Classification Search
CPC ........ G01B 11/162; G01N 25/00; B05D 1/02; B05D 1/12; B05D 3/002; B05D 3/12; B05D 5/062
(Continued)

(56) References Cited

U.S. PATENT DOCUMENTS 6,097,477 A * 8/2000 Sarrafzadeh-Khoee ..................... G01B 11/162 356/35.5
6,943,870 B2 * 9/2005 Toyooka ............ G01B 9/02022 356/512

(Continued)

FOREIGN PATENT DOCUMENTS

| CN | 101240996 A | 8/2008 |
| CN | 101905210 A | 12/2010 |
| CN | 103792117 A | 5/2014 |

*Primary Examiner* — Brian K Talbot
(74) *Attorney, Agent, or Firm* — Bulkley, Richardson and Gelinas, LLP; Mary R. Bonzagni, Esq.

(57) ABSTRACT

The disclosure relates to a method for fabricating a speckle for high temperature deformation measurement of a shaped refractory material. A technical solution includes mixing a hercynite micropowder and a liquid mixing agent in a mass ratio of (3-6):1, and ultrasonically treating to obtain a speckle mixture; polishing a surface of a shaped refractory material to be measured, removing impurities, and spraying the speckle mixture on the surface of the shaped refractory material to be measured with a pneumatic airbrush in a time hood to obtain an uncured speckle; heating the uncured speckle to 60-80° C., keeping for 1-3 h, then heating to 100-120° C., and keeping for 1-3 h to obtain a speckle for high temperature deformation measurement of a shaped refractory material. The fabricated product is suitable for high temperature deformation measurement of a shaped refractory material at 1,600° C.

4 Claims, 1 Drawing Sheet

(51) Int. Cl.
- *B05D 1/02* (2006.01)
- *B05D 1/12* (2006.01)
- *B05D 3/00* (2006.01)
- *B05D 3/12* (2006.01)
- *B05D 5/06* (2006.01)

(52) U.S. Cl.
CPC ............... *B05D 3/002* (2013.01); *B05D 3/12* (2013.01); *B05D 5/062* (2013.01)

(58) Field of Classification Search
USPC .......................................... 427/532, 534, 560
See application file for complete search history.

(56) References Cited

U.S. PATENT DOCUMENTS

| | | | |
|---|---|---|---|
| 8,269,982 B1* | 9/2012 | Olczak | G01B 11/162 356/513 |
| 2002/0190243 A1* | 12/2002 | Bartha | C04B 35/043 252/500 |
| 2019/0318469 A1* | 10/2019 | Wang | G06N 3/08 |
| 2022/0065617 A1* | 3/2022 | Goodwin | G01B 11/162 |

\* cited by examiner

METHOD FOR FABRICATING SPECKLE FOR HIGH TEMPERATURE DEFORMATION MEASUREMENT OF SHAPED REFRACTORY MATERIAL

CROSS-REFERENCE TO RELATED APPLICATIONS

This application claims the benefit of priority of Chinese Patent Application No. 201911233372.8, filed Dec. 5, 2019, the contents of which is herein incorporated by reference.

TECHNICAL FIELD

The disclosure belongs to the technical field of speckle fabrication, and specifically relates to a method for fabricating a speckle for high temperature deformation measurement of a shaped refractory material.

BACKGROUND

Refractory materials play a key role in of and safe production and product quality of thermal equipment such as iron and steel smelting. They are essential basic materials in production in high temperature industries such as metallurgy, electric power, petrochemical and aerospace industries. High temperature mechanical behavior of refractory materials has a great influence on safe and efficient operation of high temperature furnaces and quality of steel products. High temperature deformation measurement of materials generally uses displacement of a strain gauge to obtain local strain information of a shaped refractory material, that is, a contact method is used. The contact method has high requirements on high temperature resistance and stability of a measuring device, with high sensor cost and difficulty in circuit arrangement. Moreover, the method has a limited measurement range, and usually only strain at a single point or local strain can be measured. Compared with the contact method for strain measurement, non-contact strain measurement technology is based on digital image correlation (DIC) technology and machine vision principles to achieve deformation measurement. The DIC method is used to analyze surface morphology changes of a shaped refractory material with high measurement accuracy. It enables local and global detection with no interference to a sample, and detection of a whole process of stretching or compression without any influence on a tested specimen. Speckle is an information carrier of material deformation at a high temperature in material deformation measurement with the DIC method. Quality of the speckle has a great influence on measurement accuracy of the DIC method.

The patent application entitled "A method for fabricating a speckle for high temperature environmental deformation measurement" (CN 101905210A) discloses the following technology: diluting a high temperature resistant inorganic adhesive with alcohol in a volume ratio of 7:3, adding 10 wt % of CoO powder, randomly point applying, spaying or splashing on an absolute ethanol cleaned surface of a test piece with a brush or a dropper, drying and curing at room temperature for 24 h to obtain a speckle for use at a high temperature. This method is relatively simple in operation, but the high temperature resistant inorganic adhesive is expensive. Moreover, performance of the speckle relates to high temperature resistant capability of the high temperature resistant inorganic adhesive used. The speckle produced by this technology cannot be used at above 1,200° C.; and the CoO powder used is highly toxic and environmentally polluting. Furthermore, the method takes too long to fabricate a speckle, limiting promotion and application of this method.

The patent application entitled "A method for fabricating a high temperature resistant speckle" (CN 101240996A) discloses the following technology: preparing a solution with silver nitrate powder, ammonia, glucose powder and pure water, forming a silver speckle at a certain temperature on a surface of a material positioned in the solution. The speckle produced by this method has resistance to a relatively low temperature and can only be used at a temperature below 900° C. However, a refractory material has a service temperature of above 1,400° C. The speckle cannot meet this requirement, and the formula thereof contains relatively large amount of water, which has a relatively great impact on thermodynamic tests of the shaped refractory material.

The patent application entitled "A method for fabricating a speckle suitable for high temperature environments" (CN 103792117A) discloses the following technology: spraying mixed black and white high temperature resistant powders on a sample surface with a spray bottle to form random speckles. However, this method is only suitable for microscale testing due to a small powder particle size, and the maximum operating temperature of the speckle is 1,100° C.

In summary, the prior art has disadvantages that reagents for fabrication of a speckle are expensive, the time required to fabricate a speckle is too long, and the operating temperature of the fabricated speckle is low.

SUMMARY

The disclosure aims to overcome defects in the prior art, and is intended to provide a method for fabricating a speckle for high temperature deformation measurement of a shaped refractory material with a low fabrication cost and a short fabrication period. The speckle for high temperature deformation measurement of a shaped refractory material fabricated by the method is suitable for high temperature deformation measurement of a shaped refractory material at 1,600° C.

To achieve the above objective, the disclosure adopts a technical solution with specific steps as follows:
  Step 1. mixing a hercynite micropowder and a liquid mixing agent in a mass ratio of (3-6):1, and ultrasonically treating with an ultrasonic cleaner for 5-10 min at 40 kHz to obtain a speckle mixture;
  Step 2. polishing a surface of a shaped refractory material to be measured, removing impurities on the surface with absolute ethanol, and spraying the speckle mixture on the surface of the shaped refractory material to be measured with a pneumatic airbrush in a fume hood to obtain an uncured speckle on the surface of the shaped refractory material to be measured;
  Step 3. heating the uncured speckle to 60-80° C., keeping for 1-3 h, then heating to 100-120° C., and keeping for 1-3 h to obtain a speckle for high temperature deformation measurement of a shaped refractory material.

The hercynite powder has a particle size of ≤0.074 mm.
The liquid mixing agent is acetone or absolute ethanol.
The pneumatic airbrush has a nozzle with a diameter of 0.2-0.5 mm.

Based on the above technical solution, the disclosure has the following positive effects compared with the prior art:
  (1) The hercynite micropowder and the liquid mixing agent (acetone or absolute ethanol) used in the disclosure are both conventional products which ensure a low preparation cost and a preparation process not harmful to human body and environment.

(2) The disclosure obtains the uncured speckle on the surface of the shaped refractory material to be measured which is then subjected to curing treatment for 2-6 h to obtain the speckle for high temperature deformation measurement of a shaped refractory material. The fabrication period is short and the requirements on curing equipment are low, which is beneficial for large-scale promotion and application.

(3) Sintering of the hercynite micropowder used in the disclosure at about 1,100° C. further improves binding of the speckle for high temperature deformation measurement of a shaped refractory material to a substrate material to achieve desired binding to the shaped refractory material to be measured. Moreover, the hercynite micropowder has relatively desired oxidation resistance at a high temperature. It can stay stable at 1,600° C., and is not easy to fade. Thus, the fabricated speckle for high temperature deformation measurement of a shaped refractory material is suitable for high temperature deformation measurement of a shaped refractory material at 1,600° C.

The speckle for high temperature deformation measurement of a shaped refractory material fabricated in the disclosure has a uniform density distribution, a random shape and a maximum length of ≤0.5 mm. The speckle has desired bonding to an aluminosilicate refractory material and the speckle is not easy to fall off. The speckle also has desired contrast with a substrate material, meeting requirements of high temperature deformation measurement of a refractory material.

Therefore, the disclosure has a low cost and a short fabrication period, and the fabricated speckle for high temperature deformation measurement of a shaped refractory material is suitable for high temperature deformation measurement of a shaped refractory material at 1,600° C.

DETAILED DESCRIPTION

The disclosure will be further described below with reference to the accompanying drawings and specific examples which are not limiting the protection scope of the disclosure.

Specific Embodiments

A method for fabricating a speckle for high temperature deformation measurement of a shaped refractory material, including:
Step 1. mixing a hercynite micropowder and a liquid mixing agent in a mass ratio of (3-6):1, and ultrasonically treating with an ultrasonic cleaner for 5-10 min at 40 kHz to obtain a speckle mixture;
Step 2. polishing a surface of a shaped refractory material to be measured, removing impurities on the surface with absolute ethanol, and spraying the speckle mixture on the surface of the shaped refractory material to be measured with a pneumatic airbrush in a fume hood to obtain an uncured speckle on the surface of the shaped refractory material to be measured;
Step 3. heating the uncured speckle to 60-80° C., keeping for 1-3 h, then heating to 100-120° C., and keeping for 1-3 h to obtain a speckle for high temperature deformation measurement of a shaped refractory material.

The liquid mixing agent is acetone or absolute ethanol.

The hercynite micropowder has a particle size of ≤0.074 mm.

The pneumatic airbrush has a nozzle with a diameter of 0.2-0.5 mm.

EXAMPLE 1

Figure 1:
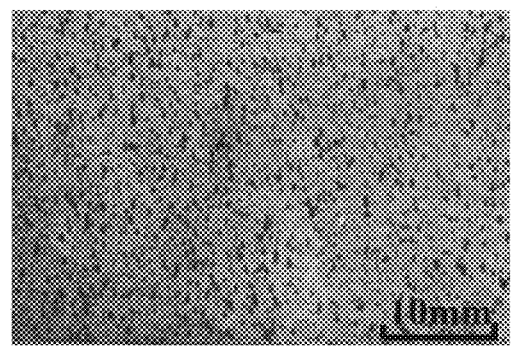
FIG. 1 is a photo of a first speckle for high temperature deformation measurement of a shaped refractory material fabricated in the disclosure.

A method for fabricating a speckle for high temperature deformation measurement of a shaped refractory material was provided. The method for fabricating a speckle in this example included the following steps:
Step 1. a hercynite micropowder and a liquid mixing agent were mixed in a mass ratio of 3:1, and subjected to ultrasonic treatment with an ultrasonic cleaner for 5 min at 40 kHz to obtain a speckle mixture.
Step 2. a surface of a shaped refractory material to be measured was polished. Impurities on the surface were removed with absolute ethanol. The speckle mixture was sprayed on the surface of the shaped refractory material to be measured with a pneumatic airbrush in a fume hood to obtain an uncured speckle on the surface of the shaped refractory material to be measured.
Step 3. the uncured speckle was heated to 60° C., kept for 3 h, then heated to 100° C., and kept for 3 h to obtain a speckle for high temperature deformation measurement of a shaped refractory material as shown in FIG. 1.

The shaped refractory material was aluminosilicate refractory material.

The liquid mixing agent was acetone.

The hercynite micropowder had a particle size of ≤0.074 mm.

The pneumatic airbrush had a nozzle with a diameter of 0.2 mm.

The speckle for high temperature deformation measurement of a shaped refractory material fabricated in this example was shown in FIG. 1. It can be seen from FIG. 1 that, the fabricated speckle had a uniform density distribution, a random shape and a maximum length of ≤0.2 mm. The speckle had desired bonding to the aluminosilicate refractory material and the speckle was not easy to fall off. The speckle also had desired contrast with a substrate material, meeting requirements of high temperature deformation measurement of a refractory material.

EXAMPLE 2

A method for fabricating a speckle for high temperature deformation measurement of a shaped refractory material was provided. The method for fabricating a speckle in this example included the following steps:
Step 1. a hercynite micropowder and a liquid mixing agent were mixed in a mass ratio of 4:1, and subjected to ultrasonic treatment with an ultrasonic cleaner for 7 min at 40 kHz to obtain a speckle mixture.

Step 2. a surface of a shaped refractory material to be measured was polished. Impurities on the surface were removed with absolute ethanol. The speckle mixture was sprayed on the surface of the shaped refractory material to be measured with a pneumatic airbrush in a fume hood to obtain an uncured speckle on the surface of the shaped refractory material to be measured.

Step 3. the uncured speckle was heated to 70° C., kept for 2 h, then heated to 110° C., and kept for 2 h to obtain a speckle for high temperature deformation measurement of a shaped refractory material.

The shaped refractory material was silicon refractory material.

The liquid mixing agent was absolute ethanol.

The hercynite micropowder had a particle size of ≤0.074 mm.

The pneumatic airbrush had a nozzle with a diameter of 0.3 mm.

Figure 2:
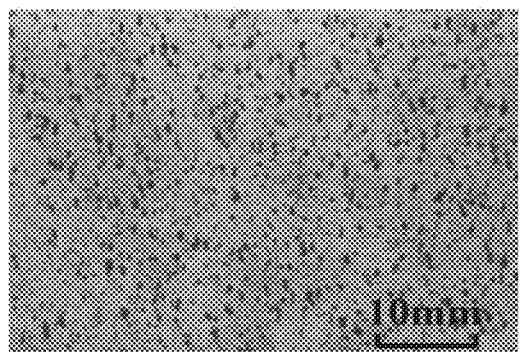
FIG. 2 is a photo of a second speckle for high temperature deformation measurement of a shaped refractory material fabricated in the disclosure.

The speckle for high temperature deformation measurement of a shaped. refractory material fabricated in this example was shown in FIG. 2. It can be seen from FIG. 2 that, the fabricated speckle had a uniform density distribution, a random shape and a maximum length of ≤0.3 mm. The speckle had desired bonding to the silicon refractory material and the speckle was not easy to fall off. The speckle also had desired contrast with a substrate material, meeting requirements of high temperature deformation measurement of a refractory material.

EXAMPLE 3

A method for fabricating a speckle for high temperature deformation measurement of a shaped refractory material was provided. The method for fabricating a speckle in this example included the following steps:

Step 1. a hercynite micropowder and a liquid mixing agent were mixed in a mass ratio of 5:1, and subjected to ultrasonic treatment with an ultrasonic cleaner for 9 min at 40 kHz to obtain a speckle mixture.

Step 2. a surface of a shaped refractory material to be measured was polished. Impurities on the surface were removed with absolute ethanol. The speckle mixture was sprayed on the surface of the shaped refractory material to be measured with a pneumatic airbrush in a time hood to obtain an uncured speckle on the surface of the shaped refractory material to be measured.

Step 3. the uncured speckle was heated to 80° C., kept for 1 h, then heated to 120° C., and kept for 1 h to obtain a speckle for high temperature deformation measurement of a shaped refractory material.

The shaped refractory material was magnesia refractory material.

The liquid mixing agent was acetone.

The hercynite micropowder had a particle size of ≤0.074 mm.

The pneumatic airbrush had a nozzle with a diameter of 0.4 mm.

Figure 3:
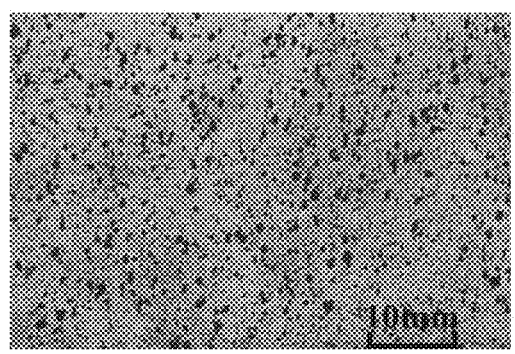
FIG. 3 is a photo of a third speckle for high temperature deformation measurement of a shaped refractory material fabricated in the disclosure.

The speckle for high temperature deformation measurement of a shaped refractory material fabricated in this example was shown in FIG. 3. It can he seen from FIG. 3 that, the fabricated speckle had a uniform density distribution, a random shape and a maximum length of ≤0.4 mm. The speckle had desired bonding to the magnesia refractory material and the speckle was not easy to fall off. The speckle also had desired contrast with a substrate material, meeting requirements of high temperature deformation measurement of a refractory material.

EXAMPLE 4

A method for fabricating a speckle for high temperature deformation measurement of a shaped refractory material was provided. The method for fabricating a speckle in this example included the following steps:

Step 1. a hercynite micropowder and a liquid mixing agent were mixed in a mass ratio of 6:1, and subjected to ultrasonic treatment with an ultrasonic cleaner for 10 min at 40 kHz to obtain a speckle mixture.

Step 2. a surface of a shaped refractory material to be measured was polished. Impurities on the surface were removed with absolute ethanol. The speckle mixture was sprayed on the surface of the shaped refractory material to be measured with a pneumatic airbrush in a fume hood to obtain an uncured speckle on the surface of the shaped refractory material to be measured.

Step 3. the uncured speckle was heated to 75° C., kept for 2 h, then heated to 115° C., and kept for 2 h to obtain a speckle for high temperature deformation measurement of a shaped refractory material.

The shaped refractory material was zircon refractory material.

The liquid mixing agent was absolute ethanol.

The hercynite micropowder had a particle size of ≤0.074 mm.

The pneumatic airbrush had a nozzle with a diameter of 0.5 mm.

Figure 4:
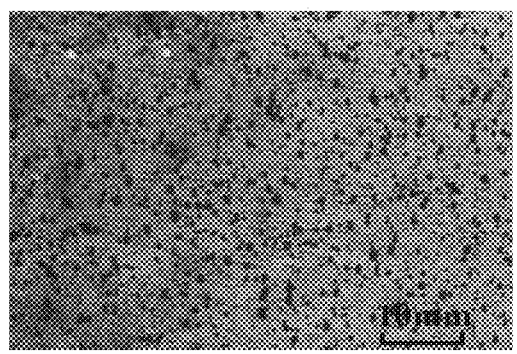
FIG. 4 is a photo of a fourth speckle for high temperature deformation measurement of a shaped refractory material fabricated in the disclosure.

The speckle for high temperature deformation measurement of a shaped refractory material fabricated in this example was shown in FIG. 4. It can be seen from FIG. 4 that, the fabricated speckle had a uniform density distribution, a random shape and a maximum length of ≤0.5 mm. The speckle had desired bonding to the zircon refractory material and the speckle was not easy to fall off. The speckle also had desired contrast with a substrate material, meeting requirements of high temperature deformation measurement of a refractory material.

Compared with the prior art, the specific embodiments of the disclosure had the following positive effects:

(1) The hercynite micropowder and the liquid mixing agent (acetone or absolute ethanol) used in the specific embodiments of the disclosure were both conventional products which ensured a low preparation cost and a preparation process not harmful to human body and environment.

(2) The specific embodiments of the disclosure obtained the uncured speckle on the surface of the shaped refractory material to be measured which was then subjected to curing treatment for 2-6 h to obtain the speckle for high temperature deformation measurement of a shaped refractory material. The fabrication period was short and the requirements on curing equipment were low, which was beneficial for large-scale promotion and application.

(3) Sintering of the hercynite micropowder used in the specific embodiments of the disclosure at about 1,100° C. further improved binding of the speckle for high temperature deformation measurement of a shaped refractory material to a substrate material to achieve desired binding to a shaped refractory material to be measured. Moreover, the hercynite micropowder had relatively desired oxidation resistance at a high temperature. It can stay stable at 1,600° C., and was not easy to fade. Thus, the fabricated speckle for high temperature deformation measurement of a shaped refractory material was suitable for high temperature deformation measurement of a shaped refractory material at 1,600° C.

The speckles for high temperature deformation measurement of a shaped refractory material fabricated in the specific embodiments of the disclosure had a uniform density distribution, a random shape and a maximum length of ≤0.5 mm. The speckle had desired bonding to an aluminosilicate refractory material and the speckle was not easy to fall off. The speckle also had desired contrast with a substrate material, meeting requirements of high temperature deformation measurement of a refractory material.

Therefore, the specific embodiments of the disclosure had a low cost and a short fabrication period, and the fabricated speckles for high temperature deformation measurement of a shaped refractory material were suitable for high temperature deformation measurement of a shaped refractory material at 1,600° C.

What is claimed is:

1. A method for fabricating a speckle for high temperature deformation measurement of a shaped refractory material, comprising the following steps:

step 1. mixing a hercynite micropowder and a liquid mixing agent in a mass ratio of (3-6):1, and ultrasonically treating with an ultrasonic cleaner for 5-10 min at 40 kHz to obtain a speckle mixture;

step 2. polishing a surface of a shaped refractory material to be measured, removing impurities on the surface with absolute ethanol, and spraying the speckle mixture on the surface of the shaped refractory material to be measured with a pneumatic airbrush in a fume hood to obtain an uncured speckle on the surface of the shaped refractory material to be measured;

step 3. heating the uncured speckle to 60-80° C., keeping for 1-3 h, then heating to 100-120° C., and keeping for 1-3 h to obtain a speckle for high temperature deformation measurement of a shaped refractory material.

2. The method for fabricating a speckle for high temperature deformation measurement of a shaped refractory material according to claim 1, wherein the hercynite micropowder has a particle size of ≤0.074 mm.

3. The method for fabricating a speckle for high temperature deformation measurement of a shaped refractory material according to claim 1, wherein the liquid mixing agent is acetone or absolute ethanol.

4. The method for fabricating a speckle for high temperature deformation measurement of a shaped refractory material according to claim 1, wherein the pneumatic airbrush has a nozzle with a diameter of 0.2-0.5 mm.

* * * * *